Patented May 5, 1936

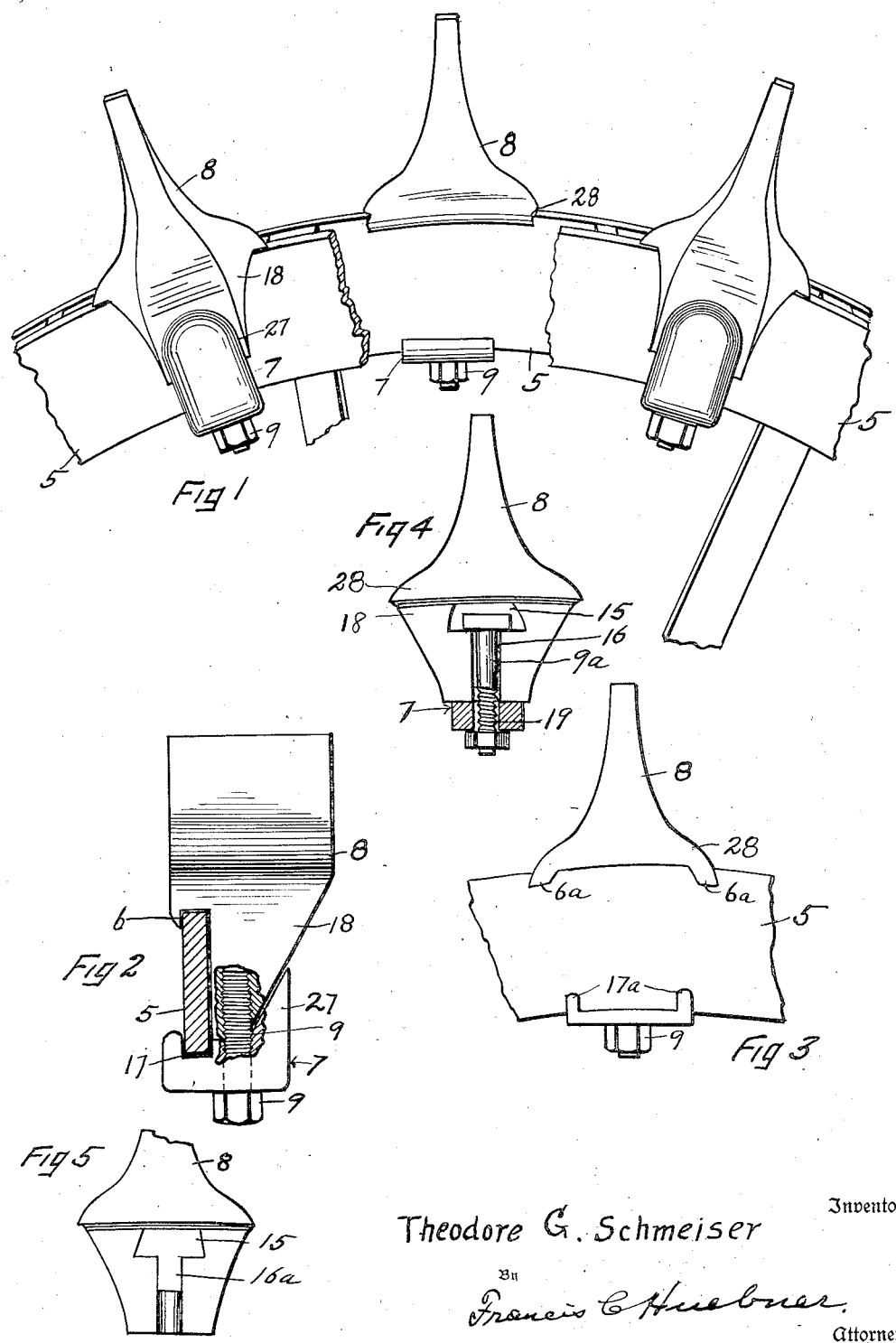

2,039,496

UNITED STATES PATENT OFFICE 2,039,496

GROUSER FOR TRACTORS

Theodore George Schmeiser, Fresno, Calif.

Application March 7, 1935, Serial No. 9,813

7 Claims. (Cl. 301—44)

My invention relates to a grouser for a tractor, and more specifically to a grouser which can be readily attached to the type of wheel having an open rim.

There has heretofore been granted to me United States patents as follows: No. 1,647,019, dated October 25, 1927, for a Grouser, and No. 1,829,945, dated Nov. 3, 1931, for a Grouser for a tractor. The present invention is a modification of the grousers described in said patents, and other well known forms, my invention adapting said grousers to be attached to rims having a comparatively narrow outside periphery and a comparatively wide side, or rims constructed of a plurality of rings having wide sides and narrow peripheries.

The object of my invention is the construction of a grouser for wheels having an open rim, or a comparatively narrow tread rim as above described. Another object is the ease with which the grouser is attached to the wheel, as no holes need be made in the rim of the wheel for the purpose of attaching the grouser. Other objects will be hereinafter disclosed.

These objects are accomplished by means of the device hereinafter described, and illustrated on the accompanying drawing in which Fig. 1 shows a fragment of a rim of a wheel constructed of two separate rings attached together a spaced distance apart, one ring having a portion broken away to disclose the ring in the rear attached thereto, one of said grousers being shown as reversed as compared with the other two.

Fig. 2 is a side view of the grouser attached to a fragment of a rim shown in section, having parts of the grouser cut away to disclose the screw or bolt adapted to fasten the parts together.

Fig. 3 shows a slight modified form of grouser.

Fig. 4 shows a rear view of the grouser without the rim, having parts cut away to show the use of a bolt in assembling the parts of the grouser.

Fig. 5 is a slight modification of Fig. 4.

Referring to the drawing, the rim 5 for which my grouser is intended has a narrow periphery. The blade 8 of the grouser is attached to or made integral with the base 28. The general form of the blade can follow the blades described in my patents above referred to, or other well known forms. The base rests on the outside periphery of the rim of the wheel, or on one of the rings forming the wheel rim as shown in Fig. 1. An apron 18 is formed integral with the base. This apron is adapted to extend along the side of the rim and toward the center of the wheel. The apron is made thick enough to support a cap screw or a stud as shown in Figs. 1 and 2, or to form a recess for a bolt as shown in Fig. 4.

A clamping member 7 has a groove 17 therein adapted to engage the under part of one of the rings, and a flange 171 adapted to engage one side of a ring. A projection 27, being a portion of said clamping member is adapted when the grouser is assembled, to overlap said apron. A stud or cap screw 9 is adapted to hold the clamping member and other portions of the grouser rigidly on the rim. My preferred construction is to form a recess 15 and a channel 16 in the base and apron. The channel is adapted to receive the stem of a bolt 9a, and the recess holds the bolt head. By this means the parts of the grouser can be clamped together by passing the bolt through hole 19 in the clamping member and applying a nut in the usual manner. For a square shank bolt channel 16a can be squared.

It is noted that the apron has a sloping face opposite the face adjacent to the rim, and the clamping member projection likewise has a sloping surface on the face adjacent to the apron. When the grouser is assembled these slopes or inclines tend to press the apron against the rim, and to clamp the ring between the parts of the grouser.

It is noted that either of grooves 6 and 17 can be substituted with lugs 6a and 17a as shown in Fig. 3, or may be substituted with flanges wide enough only to prevent the grouser from slipping from the rim when assembled therewith. This form of grouser is adapted for wheels having one or a plurality of narrow treads.

Having described my invention I claim as new and ask for Letters Patent:

1. In combination with a wheel rim having a narrow periphery and a relatively wide side, a grouser having a blade and a base, said base having a groove therein adapted to receive the outside periphery of the rim, an apron attached to the base adapted to hug one side of the rim, said apron having a sloping surface with respect to the plane of the side of the rim, clamp means adapted to extend under the inside periphery of said rim and to overlap the sloping surface of said apron, and screw means adapted to draw and hold said apron and clamping means together.

2. In combination with a wheel rim comprising a ring having a comparatively narrow tread and a comparatively wide side, a grouser consisting of a blade, a base adapted to fit over the outside periphery of said ring, an apron attached to the base adapted to hug one side of the ring, said apron being wedge shaped, a clamping member having a depression therein adapted to engage the inner periphery of the ring and to overlap the wedge shaped portion of the apron, and screw means adapted to attach the clamping member to the apron, to clamp the ring between the base and the clamping member, and to press the apron toward the side of the ring adjacent to the apron.

3. In combination with a ring having a comparatively narrow outside periphery and a wide side, being a part of a traction wheel, a grouser consisting of a blade, a base adapted to fit over the outside periphery of said ring, a wedge shaped apron attached to the base, said apron being adapted to extend along the side of the ring when the grouser is assembled with the ring, a clamping member adapted to fit the inside periphery of the ring and to overlap said apron, and one screw adapted to pass through the clamping member and to be screwed into the apron, and adapted to cooperate with the wedge shaped portion of the apron and with the clamping member to draw the apron to one side of the ring.

4. In combination with a ring having a comparatively narrow outside periphery and a wide side, said ring being a part of a traction wheel, a grouser consisting of a blade and base formed integrally, said base being adapted to fit over the outside periphery of said ring, an apron attached to the base, said apron being adapted to hug one side of the ring, said apron sloping toward the inside periphery of the ring, a retaining flange on the base opposite to the apron adapted to engage the side of the ring opposite to the apron, and clamping means adapted to hold the grouser firmly to the ring consisting of a clamping member having retaining flanges adapted to engage one side of the ring, and a wedge shaped member adapted to engage the sloping plane of the apron on the other side of said ring, and bolt means adapted to connect the base with the clamping member.

5. In combination with a ring having a comparatively narrow periphery and a wide side, said ring being a part of a traction wheel, a grouser consisting of a base, a blade attached to the base, said base being adapted to fit over the outside periphery of the ring, an apron attached to the base, said apron being adapted to extend along one side of the ring, the surface of the apron not adjacent to the ring sloping from the base toward the inside periphery of the ring, retaining means on the base opposite to the apron, a clamp member adapted to engage the inside periphery of the ring, said clamping member having retaining means opposite to the apron adapted to engage one side of the ring opposite to the apron, a wedge shaped extension adapted to engage the sloping plane of the apron, and a bolt adapted to hold the parts of the grouser together and to the ring, and to clamp the apron against the adjacent side of the ring.

6. In combination with a ring having a comparatively narrow outside periphery and a wide side, said ring being a part of a traction wheel, a grouser consisting of a base, a blade, and a wedge shaped apron formed integrally, the base being adapted to fit over the outside periphery of the ring, and the apron being adapted to extend along one side of the ring with the thickness of said apron decreasing toward the inside periphery of the ring, retaining means on the base opposite to the apron adapted to engage the ring, a bolt, a recess and slot within the base and the apron, said recess being adapted to hold the head of the bolt and the slot being adapted to receive the stem of the bolt, and clamping means adapted to hold the grouser firmly on the ring consisting of a clamping member adapted to engage the inside periphery of the ring, retaining means on the clamping member adapted to engage the ring, the clamping member having an extension thereon adapted to engage the apron, said clamping member having a hole therethrough adapted for the stem of the bolt to pass therethrough and a nut for said bolt, said nut and bolt being adapted to clamp the base and clamping member to the peripheries of the ring and to clamp the apron to the side of the ring.

7. In combination with a wheel having a ring as a part thereof, a grouser blade, said blade having a base adapted to approximately fit the outside periphery of the ring, an apron attached to the base, said apron when assembled with the ring being positioned adjacent to a side of the ring, said apron sloping from the base toward the inside periphery of the ring, retaining means consisting of a clamping member adapted to engage the inside periphery of the ring and to overlap the sloping face of the apron, and screw means adapted to connect the clamping member with the base of the blade, and adapted to clamp a sector of the ring between the base and the clamping member, and to press the apron against the side of the ring.

THEODORE G. SCHMEISER.